H. A. HOKE & C. J. BARLEY.
PISTON PACKING.
APPLICATION FILED APR. 21, 1913.
1,082,523.  Patented Dec. 30, 1913.
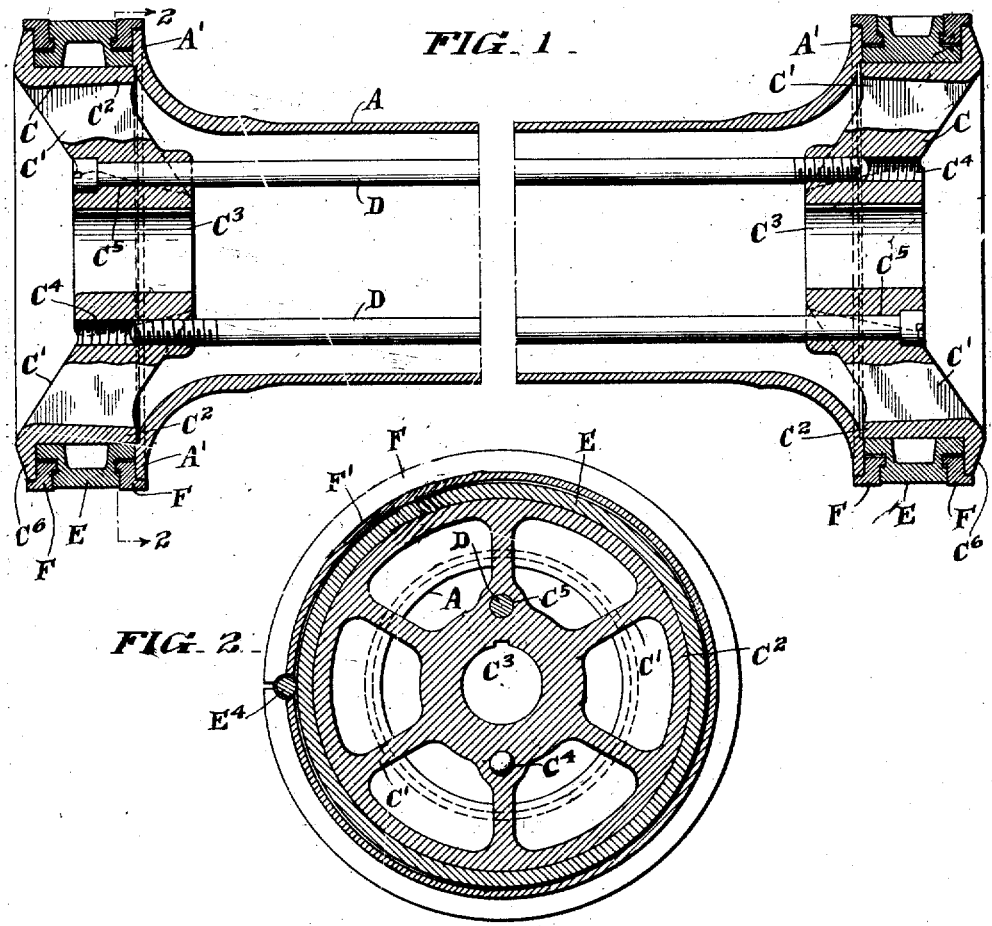
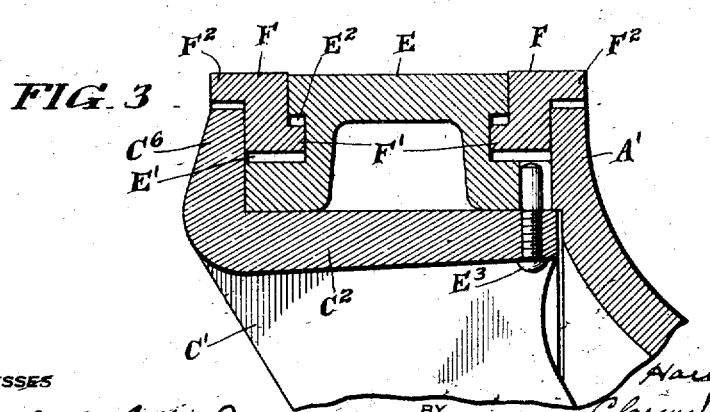
WITNESSES
INVENTORS

UNITED STATES PATENT OFFICE.

HARRY A. HOKE AND CLARENCE J. BARLEY, OF ALTOONA, PENNSYLVANIA.

PISTON-PACKING.

1,082,523.

Specification of Letters Patent.   Patented Dec. 30, 1913.

Application filed April 21, 1913.   Serial No. 762,456.

*To all whom it may concern:*

Be it known that we, HARRY A. HOKE and CLARENCE J. BARLEY, both citizens of the United States of America, residing in Altoona, in the county of Blair and State of Pennsylvania, have invented a certain new and useful Improvement in Piston-Packing, of which the following is a true and exact description, reference being had to the accompanying drawings, which form a part thereof.

Our present invention relates to pistons, and particularly to the construction of the spring metal packing or snap rings employed to prevent leakage between a piston and the wall of the cylinder in which it works, and the manner in which these rings are mounted in the piston.

The object of the present invention is to provide simple and effective means for the purpose specified characterized by the provisions made for anchoring the snap rings to the piston body in such manner that in case of fracture of the rings the broken apart segments cannot escape from the piston and thereby injure the latter or the cylinder in which the piston works, but on the contrary will be held in place and still be effective to a degree to prevent leakage between the piston and the cylinder in which it works.

The various features of novelty which characterize our invention are pointed out with particularity in the claims annexed to and forming a part of this specification. For a better understanding of the invention, however, and of the advantages possessed by it, reference should be had to the accompanying drawings and descriptive matter in which we have illustrated and described one embodiment of our invention.

Of the drawings: Figure 1 is a sectional elevation of a piston provided with snap rings constructed and mounted in accordance with the present invention; Fig. 2 is a section on the line 2—2 of Fig. 1; and Fig. 3 is a partial section taken similarly to Fig. 1, but on a larger scale.

In the drawings we have shown our invention embodied in a piston adapted to serve as a piston distributing valve of a locomotive. In the particular construction illustrated the piston body proper comprises a spool or barrel A expanded at its ends to provide radially extending flange portions A, against which piston heads C are clamped by bolts D. As shown each piston head comprises a hub portion connected by yoke or web portions C' to an annular rim portion $C^2$. The hub portion of each head is formed with a central passage $C^3$ to receive the piston rod and with passages $C^4$ and $C^5$ to receive the bolts D. As shown, the passage $C^4$ is threaded to receive the threaded end of one of the bolts D and the passage $C^5$ is counter sunk to receive the head of the other bolt D. The rim portion $C^2$ of each head C is provided at its end remote from the adjacent spool flange A' with an outwardly projecting radial flange portion $C^6$. The flange portion $C^6$ and the adjacent spool flange A' thus form the sides, and the periphery of the rim portion $C^2$ forms the bottom of a circumferential groove, which in the assembled piston construction receives a bull ring E, which is secured against turning by a stud $E^3$. Each bull ring E is of a size at its inner curved surface to snugly fit between the corresponding flanges $C^6$ and A' but the outer portion of the bull ring is cut away to form a circumferential slot E' having an under cut portion $E^2$ between the bull ring and the adjacent flange $C^6$ or A'. Each slot E' receives a corresponding spring metal packing or snap ring F. Each ring F which is cut apart as usual at one point along its circumference, comprises a body portion with flat sides fitting easily between the side of the reduced outer portion of the bull ring and the adjacent side of the adjacent flange $C^6$ or A' as the case may be, and also comprises a laterally projecting rib F' at its inner edge which extends into the under cut slot portion $E^2$. Preferably each snap ring is Z shape in cross section, as shown, the outer lateral rib or flange $F^2$ projecting over the periphery of the corresponding flange $C^6$ or A' as the case may be.

The parts are so proportioned that each ring F has the usual capacity for radial movement to compensate for wear and to insure the desired contact between the periphery of the snap ring and the cylinder wall in which the piston works. Moreover, in case a snap ring F breaks into two or more pieces in operation as sometimes occurs, the pieces cannot escape from their seats in the piston and thus injure the piston or the wall of the cylinder, but are held in place and serve to materially decrease the leakage between the piston and the cylinder wall below that which would occur if the ring were removed. The advantages thus secured by our new construction are of prime importance when the piston in which the rings are mounted is the piston distributing valve of a locomotive and especially a locomotive using preheated steam. In such use fractures of the snap rings are of frequent occurrence and with the snap ring constructions and mountings heretofore employed the pieces of the broken snap rings escaping from their seats in the piston have frequently cut the cylinder wall at the margins of the steam ports controlled by the piston valve so badly as to require very substantial reboring operations on the cylinder or the scraping of the latter. With the present invention the possibility of injury from this cause is greatly minimized, and when the fracture of the packing rings occurs on a locomotive on the road, the leakage permitted by the broken snap rings is not great enough to prevent the locomotive from reaching the end of its run before repairs are made. It will be understood, of course, that in the particular construction illustrated it is necessary to loosen the bolts D and to separate the corresponding head C from the adjacent end of the piston barrel to remove a broken or worn snap ring and to insert a new snap ring.

As shown in Fig. 2, the bull ring E may have a pin E⁴ mounted in it to engage the ends of each cut apart ring F and prevent the latter from turning about the piston.

While in accordance with the provisions of the statutes we have illustrated and described the best forms of our invention now know to us, it will be apparent to those skilled in the art that changes may be made in the form of the apparatus disclosed without departing from the spirit of our invention, and that under some conditions certain features of our invention may be used without a corresponding use of other features.

Having now described our invention what we claim as new and desire to secure by Letters Patent is:

1. In combination, a piston formed with a circumferential packing ring slot having an under cut portion, and comprising rigid parts and means rigidly connecting said parts in the normal condition of the piston but releasable to permit the axial separation of the parts, one of said rigid parts forming one side wall and the other the opposite side wall of said slot, and a spring metal packing ring movably mounted in said slot and formed with a portion projecting into the under cut portion of said slot and preventing the escape of the broken apart ring segments in case of the fracture of the ring but not interfering with the expansion and contraction of the ring in normal operation.

2. In combination, a piston comprising a body portion having a circumferential outwardly projecting flange at its end, a piston head comprising a cylindrical rim portion one end of which engages said body portion and the other end of which is provided with a circumferential outwardly extending flange whereby said flanges form the sides, and the periphery of said cylindrical rim forms the bottom of a circumferential channel, a bull ring received in said channel and recessed at opposite sides to provide a circumferential slot having an under cut portion at each side of the bull ring and between it and the adjacent of said circumferential flanges, spring metal packing rings received one in each of said slots and each formed with a lateral rib at its inner edge extending into the undercut portion of said slot and a lateral flange at its outer edge projecting over the corresponding one of said circumferential flanges, and means for securing said piston head and body together.

HARRY A HOKE.
CLARENCE J. BARLEY.

Witnesses:
E. M. McNEIL,
JAMES T. HANLON.

DISCLAIMER.

1,082,523.—*Harry A. Hoke* and *Clarence J. Barley*, Altoona, Pa.  PISTON PACKING. Patent dated December 30, 1913. Disclaimer filed July 10, 1914, by the patentees.

"Enter this disclaimer to, and disclaim the entire subject matter claimed in, said Letters Patent."

[*Official Gazette, July 21, 1914.*]

leakage between the piston and the cylinder wall below that which would occur if the ring were removed. The advantages thus secured by our new construction are of prime importance when the piston in which the rings are mounted is the piston distributing valve of a locomotive and especially a locomotive using preheated steam. In such use fractures of the snap rings are of frequent occurrence and with the snap ring constructions and mountings heretofore employed the pieces of the broken snap rings escaping from their seats in the piston have frequently cut the cylinder wall at the margins of the steam ports controlled by the piston valve so badly as to require very substantial reboring operations on the cylinder or the scraping of the latter. With the present invention the possibility of injury from this cause is greatly minimized, and when the fracture of the packing rings occurs on a locomotive on the road, the leakage permitted by the broken snap rings is not great enough to prevent the locomotive from reaching the end of its run before repairs are made. It will be understood, of course, that in the particular construction illustrated it is necessary to loosen the bolts D and to separate the corresponding head C from the adjacent end of the piston barrel to remove a broken or worn snap ring and to insert a new snap ring.

As shown in Fig. 2, the bull ring E may have a pin E⁴ mounted in it to engage the ends of each cut apart ring F and prevent the latter from turning about the piston.

While in accordance with the provisions of the statutes we have illustrated and described the best forms of our invention now know to us, it will be apparent to those skilled in the art that changes may be made in the form of the apparatus disclosed without departing from the spirit of our invention, and that under some conditions certain features of our invention may be used without a corresponding use of other features.

Having now described our invention what we claim as new and desire to secure by Letters Patent is:

1. In combination, a piston formed with a circumferential packing ring slot having an under cut portion, and comprising rigid parts and means rigidly connecting said parts in the normal condition of the piston but releasable to permit the axial separation of the parts, one of said rigid parts forming one side wall and the other the opposite side wall of said slot, and a spring metal packing ring movably mounted in said slot and formed with a portion projecting into the under cut portion of said slot and preventing the escape of the broken apart ring segments in case of the fracture of the ring but not interfering with the expansion and contraction of the ring in normal operation.

2. In combination, a piston comprising a body portion having a circumferential outwardly projecting flange at its end, a piston head comprising a cylindrical rim portion one end of which engages said body portion and the other end of which is provided with a circumferential outwardly extending flange whereby said flanges form the sides, and the periphery of said cylindrical rim forms the bottom of a circumferential channel, a bull ring received in said channel and recessed at opposite sides to provide a circumferential slot having an under cut portion at each side of the bull ring and between it and the adjacent of said circumferential flanges, spring metal packing rings received one in each of said slots and each formed with a lateral rib at its inner edge extending into the undercut portion of said slot and a lateral flange at its outer edge projecting over the corresponding one of said circumferential flanges, and means for securing said piston head and body together.

HARRY A HOKE.
CLARENCE J. BARLEY.

Witnesses:
E. M. McNEIL,
JAMES T. HANLON.

DISCLAIMER.

1,082,523.—*Harry A. Hoke* and *Clarence J. Barley*, Altoona, Pa. PISTON PACKING. Patent dated December 30, 1913. Disclaimer filed July 10, 1914, by the patentees.

"Enter this disclaimer to, and disclaim the entire subject matter claimed in, said Letters Patent."

[*Official Gazette, July 21, 1914.*]

DISCLAIMER.

1,082,523.—*Harry A. Hoke* and *Clarence J. Birley*, Altoona, Pa. PISTON PACKING. Patent dated December 30, 1913. Disclaimer filed July 10, 1914, by the patentees.

"Enter this disclaimer to, and disclaim the entire subject matter claimed in, said Letters Patent."

[*Official Gazette, July 21, 1914.*]